United States Patent [19]
Hurd et al.

[11] 3,986,403
[45] Oct. 19, 1976

[54] WRITING INSTRUMENT EMPLOYING ADJUSTABLE HOUSING CARRYING STRAIN GAGE AND REMOVABLE RESERVOIR

[75] Inventors: Clinton J. Hurd, Los Gatos; William J. Kadzewick, San Jose, both of Calif.

[73] Assignee: Xebec Systems, Inc., Sunnyvale, Calif.

[22] Filed: Feb. 13, 1976

[21] Appl. No.: 657,715

[52] U.S. Cl. ............................ 73/432 R; 401/209
[51] Int. Cl.² ........................................ G01L 5/00
[58] Field of Search .......... 73/432 R; 401/209, 210, 401/211, 212, 213, 214, 217; 340/146.3 SX

[56] References Cited
UNITED STATES PATENTS

| | | | |
|---|---|---|---|
| 3,055,341 | 9/1962 | Riepe | 401/29 |
| 3,915,015 | 10/1975 | Crane et al. | 73/432 R |

*Primary Examiner*—S. Clement Swisher
*Attorney, Agent, or Firm*—Boone, Schatzel, Hamrick & Knudsen

[57] ABSTRACT

A writing instrument comprising a housing including a flexible diaphragm and a sidewall forming a cavity therewithin, the diaphragm serving to distort in response to a movement of the sidewall, a plurality of strain gages attached to selected locations on the diaphragm, each strain gage having an electrical resistance and being responsive to distortion of the diaphragm and operative to produce a change in its electrical resistance corresponding to the distortion at its respective location, a reservoir capable of holding writing fluid and formed to be carried within the cavity, the reservoir including external ribs for frictionally engaging the sidewall and having a shaft extending therefrom, the shaft having a distal end for writing on a surface and a passageway for supplying writing fluid to the distal end, the distal end being movable in response to contact with the surface, whereby when the shaft is moved, such movement is transmitted through the reservoir and the sidewall to the diaphragm causing it to distort, and whereby such distortion causes the electrical resistance of the strain gages to change, and a bridge circuit responsive to the change in electrical resistance of the plurality of strain gages and operative to produce a signal representative of the movement of the distal end.

10 Claims, 5 Drawing Figures

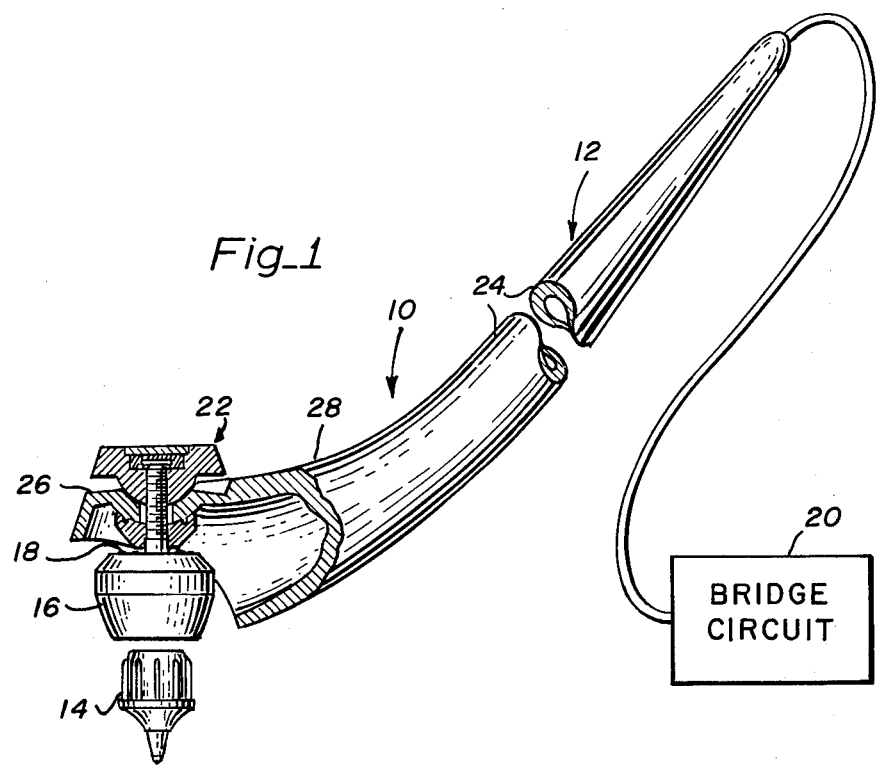
Fig_1
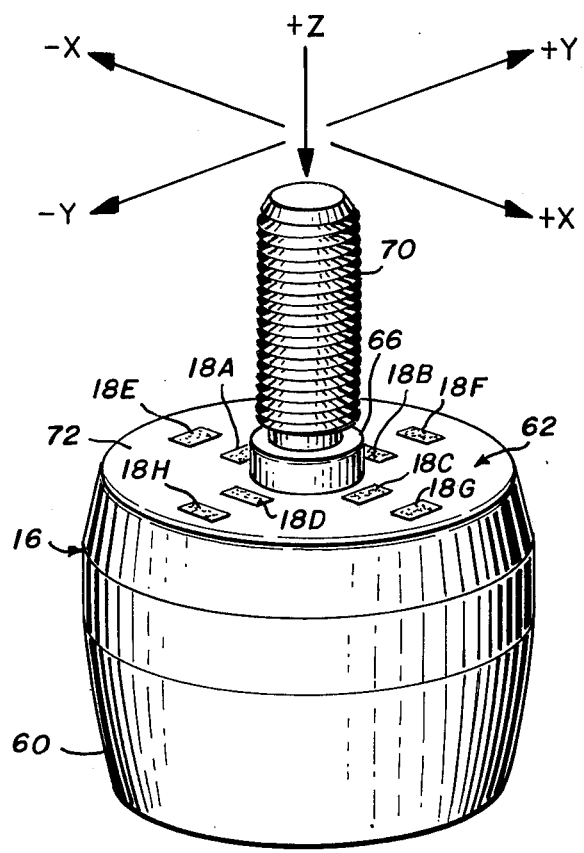
Fig_3

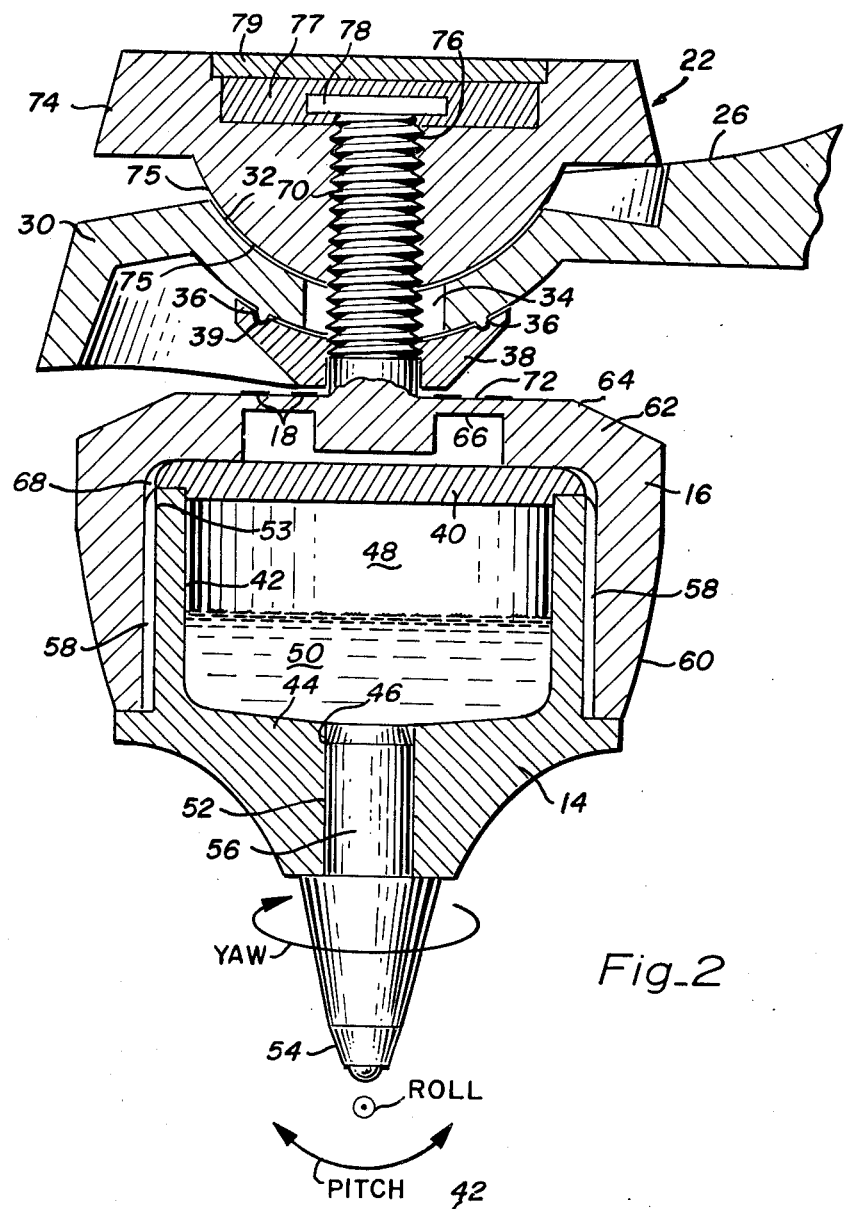
Fig_2
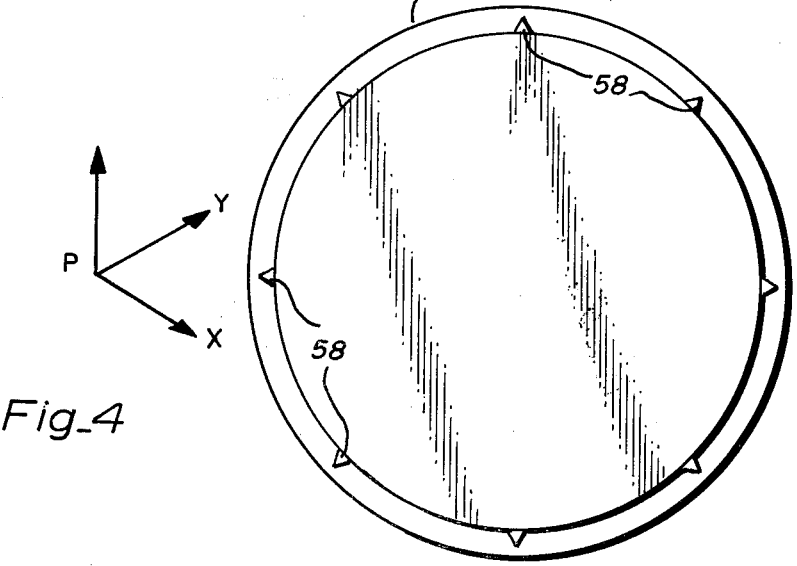
Fig_4

WRITING INSTRUMENT EMPLOYING ADJUSTABLE HOUSING CARRYING STRAIN GAGE AND REMOVABLE RESERVOIR

BACKGROUND OF THE INVENTION

1. Field of the Invention

The present invention relates generally to a writing instrument employing a strain gage transducer apparatus, and more particularly, to a writing instrument which transmits the motion of its pen tip through a reservoir and a housing to a flexible diaphragm which distorts in accordance with the force applied to, and the direction of motion of, the pen tip.

2. Description of the Prior Art

Character recognition systems for converting each character of a hand printed message, as it is being written, to a set of electrical signals which uniquely identify each character of the hand written message include a pen which produces the physical character and which develops an electrical signal representative of the direction being taken.

Heretofore such pens have typically included a ball point ink cartridge having a tip which is adapted to contact the writing medium and an opposed end which is directly attached to a flexible diaphragm. The diaphragm is mounted in a housing with its periphery being clamped to the housing in such a manner that the diaphragm is capable of distorting in response to force exerted on and the direction of motion of the tip. Strain gage transducers attached to a surface of the diaphragm exhibit characteristic electrical resistance changes corresponding to the distortion of the diaphragm and are connected in a bridge circuit which produces a resultant electrical signal that is representative of the force on and direction of motion of the tip. However, problems have been encountered in maintaining a tight bond around the entire periphery of the diaphragm and in many pens, portions of the periphery separate slightly from the housing. A disadvantage of such separation is that in operation the diaphragm tends to distort nonlinearly, such distortion resulting in a degradation of system performance. In addition, because the cartridge is mounted directly to the diaphragm, the pen is relatively insensitive to forces which produce only small distortions in the diaphragm. Another disadvantage is that such pens have included an external ink carrying reservoir which is not integral with the cartridge and is subject to accumulating air bubbles in the ink when the pen is turned upside down. This tends to cause fluctuations in the intensity of the characters written by the pen.

An example of such a pen may be found in U.S. Pat. No. 3,915,015, entitled "Strain Gauge Transducer System", by H. D. Crane, J. C. Taenzer and Gerry B. Andeen. Other examples of the prior art may be found in U.S. Pat. No. 3,145,367, entitled "Character Recognition Circuit", by H. D. Crane; U.S. Pat. No. 3,462,548, entitled "Combined Writing Device and Computer Input", by Robert M. Rinder; and in U.S. Pat. No. 3,906,444, entitled "Special Pen And System For Handwriting Recognition", by H. D. Crane and R. E. Savoie.

SUMMARY OF THE PRESENT INVENTION

It is therefore a primary object of the present invention to provide an improved writing instrument which can simultaneously generate signals indicative of the direction of motion of the pen as well as the amount of pressure being used.

Another object of the present invention is to provide a pen which is highly sensitive to small movements of its writing tip.

Still another object of the present invention is to provide a pen having an internal reservoir which is removable and completely enclosed.

Yet another object of the present invention is to provide a pen having a housing which can be initially oriented in the pitch, roll and yaw directions to suit the distinct writing positions of the user.

Briefly, the preferred embodiment includes a housing having a flexible diaphragm and having a sidewall forming a cavity therewithin, the diaphragm serving to distort in response to a movement of the sidewall, a plurality of strain gages attached to selected locations on the diaphragm, each strain gage having an electrical resistance and being responsive to distortion of the diaphragm and operative to produce a change in its electrical resistance corresponding to the distortion at its respective location, a reservoir capable of holding writing fluid and formed to be carried within the cavity, the reservoir including external ribs for frictionally engaging the sidewall and having a cartridge extending therefrom, the cartridge having a distal end for writing on a surface and a passageway for supplying writing fluid to the distal end, the distal end being movable in response to contact with the surface, whereby when the cartridge is moved, such movement is transmitted through the reservoir and the sidewall to the diaphragm causing it to distort, and whereby such distortion causes the electrical resistance of the strain gages to change, and a bridge circuit responsive to the change in electrical resistance of the plurality of strain gages and operative to produce a signal representative of the movement of the distal end.

The principal advantage of the present invention is that it is relatively sensitive to small forces exerted on its writing tip.

Another advantage of the present invention is that it includes an ink reservoir which is removably carried internal to the instrument and which is sealed in such a manner as to prevent the ink from spilling.

Yet another advantage of the present invention is that its housing is adjustable in pitch, roll and yaw directions to suit the user.

These and other objects and advantages of the present invention will no doubt become apparent to those of ordinary skill in the art after having read the following detailed description of the preferred embodiment which is illustrated in the several figures of the drawing.

IN THE DRAWING

FIG. 1 is an exploded diagrammatic view showing a writing instrument in accordance with the present invention;

FIG. 2 is a cross section of a portion of the instrument shown in FIG. 1;

FIG. 3 is a perspective view generally illustrating the housing of the instrument;

FIG. 4 is a plan view of the reservoir of the instrument; and

DETAILED DESCRIPTION OF THE PREFERRED EMBODIMENT

Figure 5:
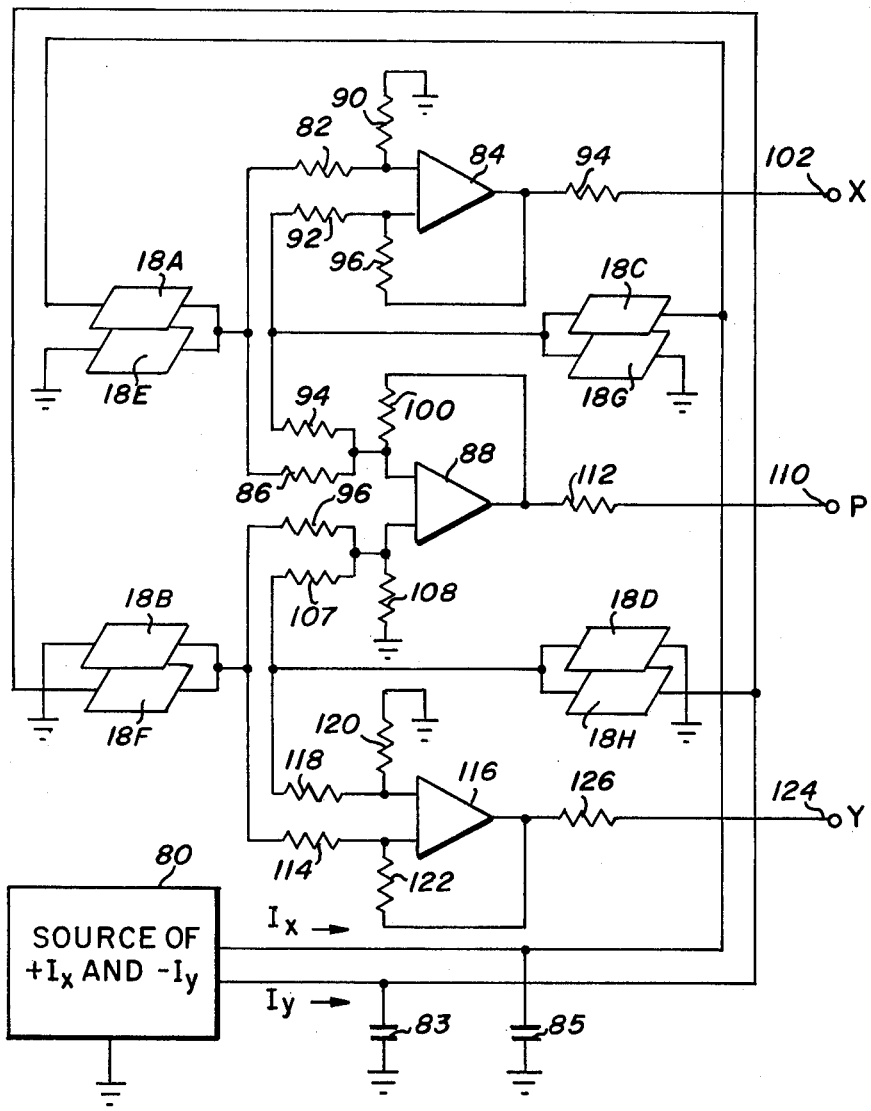
FIG. 5 is a schematic circuit diagram, illustrative of the bridge circuit employed in the writing instrument.

Referring now to FIG. 1 of the drawing, a writing instrument 10 is illustrated in an exploded view in accordance with the present invention.

The writing instrument 10 includes a handle 12, a reservoir 14, a housing 16, a plurality of strain gages 18, a bridge circuit 20, and a locking assembly 22.

The handle 12 includes an elongated body 24 and a base 26, and is of unitary construction with a hollow interior. The elongated body 24 is suitably scaled and shaped to accommodate the hand of a user and includes a sculpted out portion 28 formed to assure that the fingers of the user will always grasp the body at the indentical location. With reference also to FIG. 2, the base 26 includes a top wall 30 having a generally spherically-concave portion 32 with a central opening 34. The opening 34 subtends an arc of about 20° and serves to permit a rotational movement of an element extending therethrough as will be subsequently described. The lower surface of the portion 32 includes four pins 36 acting as stops which serve to restrict rotational movement of a collar 38.

The reservoir 14 includes a planar top wall 40, a generally cylindrical sidewall 42 and a bottom wall 44 that is generally U-shaped in cross section and has a central opening 46. The walls 40, 42 and 44 form an internal cavity 48 that is capable of containing a writing fluid, such as ink 50 or the like under pressure. An ink shaft 52 having a ballpoint 54 at its distal end and a passageway 56, is press fit into the opening 46 and serves to seal the cavity 48. Alternatively, the shaft is threaded and is screwed into a mating threaded hole in the reservoir. The passageway 56 serves to continuously provide ink 50 to the ballpoint 54. A plurality of ribs 58 is molded to the outer surface of the sidewall 42. The ribs 58 extend substantially the entire length of the sidewall in the same direction as the cartridge 52, have a continual taper at the top end 53 and have a triangular cross section as shown in FIG. 4. The ribs 58 are comprised of a resilient material such as plastic, or the like, that collapse or deform when the ribs frictionally engage a rigid surface. In the preferred embodiment the reservoir and the ribs are integrally formed from plastic.

The housing 16 includes a sidewall 60 depending from an upper portion 62. The sidewall 60 is generally annular in cross section and has an inner diameter that is slightly less than the diameter of the sidewall 42 and ribs 58 of the reservoir 14. The upper portion 62 includes flanges 64 that are contiguous with and have substantially the same thickness as the sidewall 60 and a relatively thin central disc or diaphragm 66. Because of its thin walls, the diaphragm 66 is flexible and is capable of being distorted or deformed when a force is transmitted to it through the sidewall 60 and the flanges 64. Thus, the sidewall 60 and upper portion 62 form a generally cylindrical internal cavity 68 therewithin that serves to receive the conforming top wall 40 and sidewall 42 of the reservoir 14 in an interference fit. A threaded member 70 extends axially outwardly from the diaphragm 66 and serves to mount the housing 16 to the handle 12. Accordingly, the upper surface 72 of the diaphragm is generally annular in plan view (see FIG. 3). In the preferred embodiment the diaphragm, flanges, sidewall and threaded member are integrally formed from a stainless steel block.

Referring again to FIG. 2, the locking assembly 22 includes the threaded member 70, the collar 38 and a locking cap 74. The collar 38 includes a pair of recesses 39 adapted to receive the stops 36 and hence prevent the housing from rotating about an axis through the shaft 52. The vertical dimension of the collar 38 is such that its lower surface remains out of contact with the strain gages 18 when the locking assembly 22 is tightened. The locking cap 74 has a spherically convex portion 75 to mate with the portion 32 of the top wall 30 and a threaded opening 76 to mate with the member 70. A recess 77 is formed in the top of the cap 74 and serves to receive the end of the member 70. A nut 78 is bonded to the endmost threads of the member and serves as a stop to prevent the removal of the member from the cap. A lid 79 serves to enclose the recess 77 for aesthetic purposes.

The locking assembly 22 serves to lock the housing 16 and hence the cartridge 52 in a desired orientation for the user relative to the pitch, roll and yaw directions. In particular, with the cap 74 loosened, the member 70 is moved within the constraints of the opening 34 to a desired angle in the pitch direction, and in the roll direction (which is in a plane normal to that of the plane of the paper). It should be noted that the stops 36 remain within the recesses 39 to prevent rotational movement in the yaw direction. Once the desired orientation is achieved the cap 74 is tightened, thus locking the housing 16 relative to the handle 12.

Eight strain gages 18 A–H arranged in four pairs and lying on lines forming coordinate X and Y axes intersecting the center of the diaphragm 66 are attached to the surface 72 as shown in FIG. 3. In the preferred embodiment, the strain gages 18 are comprised of a bar of silicon and are attached to the surface as with a bonding technique well known to those skilled in the art. The silicon is about 20 mils by 20 mils by 0.5 mils. Each strain gage 18 has a characteristic electrical resistance in its unstressed state and responds to a distortion or flexure (either compression or tension) of the portion of the diaphragm 66 at which it is located by becoming elongated or compressed so as to have its resistance change by an amount corresponding to the magnitude and the direction of the distortion. The change in resistance is substantially linear relative to the magnitude of the distortion. Over the normal range of operation, the magnitudes of compression and tension in opposing gages forming each pair is normally equal. It has been found that when four of the gages 18 A–D are arranged in a circular pattern around and close to the center of the surface 72 on quadrantially disposed radii (+X, −X, +Y, −Y) and the remaining four gages 18 E–H are arranged on the periphery of a concentric circle having a larger radius than that on which the gages 18 A–D lie, then the strain gage apparatus 18 is able to achieve maximum sensitivity, minimum thermal sensitivity and the best all-around response.

More particularly, maximum stress occurs in the radial direction for both torque (X—Y) and in line (pressure) deflection of the diaphragm. This radial stress is at an absolute maximum at the inner edge of the diaphragm and decreases and changes sign toward the outer edge. The ratio of the absolute radial stresses at the inner and outer radii is roughly inversely proportional to the ratio of the radii. For greatest sensitivity, it is desired to place the strain in the regions of greatest stress (and hence strain) consistent with other constraints and as the size of the gage and ability to maintain temperature. Thus, the gages should be placed as close as practical to the inner or outer radii but should not be placed near the average radii.

X and Y forces produce stresses and strains in the diaphragm in proportion to the length of the moment arm from the diaphragm 66 to the ballpoint 54. The response of the gages to a vertical force P, however, is independent of the moment arm. Hence, by including the sidewall 60 and the reservoir 14 between the diaphragm 66 and the ballpoint 54, the sensitivity of the writing instrument 10 to changes in the X and Y forces on the ballpoint are greatly increased.

To distinguish between lateral distortions in the X and Y directions and a vertical force P, the strain gages 18 are interconnected into a multiple bridge circuit arrangement, as shown in FIG. 5. A constant current source 80, designated as source of Ix and Iy, provides the output current Ix and Iy. These are connected to two bus lines. Across these two bus lines are connected two capacitors 83, 85, which have an equal value, and whose center point is grounded. Ix is connected to one terminal of the two terminal strain gages respectively designated by reference numerals 18A and 18C.

The Iy bus is connected to one terminal of the respective strain gages 18F and 18H. Terminals 18D, 18C, 18E, and 18B are connected to ground. The other terminals of strain gages 18A and 18E are connected to a line which extends through a first resistor 82 to one input to a differential amplifier 88. The side of resistor 82 which is connected to the differential amplifier 84 is connected to ground through another resistor 90.

Strain gages 18C and 18G have their other ends connected together and to a line which has one end connected through a resistor 92 to the other input to amplifier 84. The other end of this line is connected through a resistor 94 to the same input to the amplifier 88 as the one to which the resistor 86 is connected. A feedback resistor 96 is connected between the output of the amplifier 84 and the input to which the resistor 92 is connected. A feedback resistor 100 is connected between the output of the amplifier 88 and the input to which resistors 86 and 94 are connected. The output of the differential amplifier 84 is applied to an output terminal 102 through a resistor 104. This output is a signal indicative of motion in one direction, here designated as X.

The other side of the strain gages 18B and 18F are connected to a line, one side of which is connected through a resistor 96 to the differential amplifier 88. This differential amplifier input is also connected to ground through a resistor 108. The output differential amplifier 88 is applied to an output terminal 110 through a resistor 112. The signal at the output terminal 110 is proportional to the upward force on the diaphragm 66 as the pen is pushed against a surface.

The other end of the line connected to the strain gages 18B and 18F is connected through a resistor 114 to one input of an operational amplifier 116. The other end of the line connected to the strain gages 18D and 18H is connected through a resistor 118 to a second input to the differential amplifier 116. This second input is connected to ground through a resistor 120. Feed-back from the output of the differential amplifier 116 to the input to which the resistor 114 is connected is made through a resistor 122. The output of the differential amplifier 116 is connected to a terminal 124 through a resistor 126. The output at the terminal 124 is representative of motion orthogonal to motion X represented by output appearing at the terminal 122 and is designated by the letter Y.

From the foregoing, it will be seen that what is provided is a three-dimensional force transducer which provides signals indicative of direction of force or motion in a plane and the force applied to that plane via the transducer. It will also be seen that the X output derives from the voltage difference existing between strain gage pairs 18A and 18E and 18C and 18G which are on opposite sides of the center of the diaphragm and along a line extending therethrough. The Y output is derived from the voltage difference existing between strain gage pair 18B and 18F and pair 18D and 18H which are on opposite sides of the center of the diaphragm and along a line extending therethrough. The Y output is derived from the voltage difference existing between strain gage pair 18B and 18F and pair 18D and 18H which are on opposite sides of the center of the diaphragm and along a line orthogonal to the first line at the center of the diaphragm. Vertical force output may be obtained directly from the sum of the 18A, 18E, 18C and 18G outputs or from the sum of the 18B, 18F, 18D and 18H outputs. By arranging the bridge so that these two sums move in opposite directions (with an applied force P), they are added directly in a differential amplifier so that all four pairs of gages contribute equally to the vertical force signal P. Where there is no force on the pen point 54, all bridges are balanced, and the output of all amplifiers is nominally zero.

The details of operation of the bridge circuit 20 is more completely described in the previously mentioned U.S. Pat. No. 3,915,015 to Crane et al and the teachings of that patent are incorporated herein by reference for the teachings of bridge circuits for use in the present invention. Using large scale integration techniques, it is possible to deposit substantial portions of the bridge circuit on the diaphragm also without impeding its response to pen motion thereby considerably reducing noise and other pickup problems.

In operation, assuming that the reservoir 14 has been inserted into the cavity 68 and the housing 16 has been adjusted in pitch and roll to suit the hand geometry of the user, the user grips the body 24 with his fingers in the sculpted-out portions 28 and places the ballpoint 54 in contact with the writing surface (not shown). The user then moves the ballpoint against the surface forming a character, or set of characters, if the system is one in which a continuous script is recognized. Movement of the ballpoint causes the cartridge 52 to deflect due to the lateral reactive forces (X and Y) and the vertical reactive force (P) exerted by the surface against the ballpoint. This deflection is transmitted through the bottom wall 44 and sidewall 42 of the reservoir 14 to the sidewall 60 and the flanges 64 of the housing. Because of the relatively large contact area between the sidewalls 42 and 60, and the presence of the ribs 58, loss in amplitude of the deflection as it is transferred between the reservoir 14 and the housing 16 is negligible. Accordingly, this movement is then transferred to the diaphragm 66, causing it to distort. Such distortion produces a change in the resistance of the strain gages 18 A–H which is detected by the bridge circuit 20. As previously described, the change in resistance corresponds to the deflection of the cartridge 52.

In alternative embodiments, the strain gages are comprised of sheets of etched metal foil.

From the above, a pen having a high sensitivity to small movements of its cartridge is provided.

The terms "top", "bottom" and words of similar import as used herein are intended to apply only to the position of the parts as illustrated in the drawing.

Although the present invention has been described above in terms of a preferred embodiment, it will be appreciated that various alterations and modifications thereof will become apparent to those skilled in the art after having read the preceding disclosure. Accordingly, it is intended that the following claims be interpreted as including all such alterations and modifications as fall within the true spirit and scope of the invention.

What is claimed is:

1. A writing instrument comprising
    a housing including a flexible diaphragm and means forming a cavity therewithin, said diaphragm serving to distort in response to a movement of said means forming a cavity;
    strain gage means attached to selected locations on said diaphragm and having an electrical resistance, said strain gage means being responsive to distortion of said diaphragm and operative to produce a change in its electrical resistance corresponding to the distortion at its respective location;
    a reservoir carried within said cavity and capable of holding writing fluid, said reservoir including a shaft extending therefrom, said shaft having a distal end for writing on a surface and having a passageway for supplying writing fluid to said distal end, said distal end being movable in response to contact with the surface, whereby when said shaft is moved, such movement is transmitted through said reservoir and said means forming a cavity to said diaphragm causing it to distort, and whereby such distortion causes the electrical resistance of said strain gage means to change, the change in electrical resistance corresponding to the movement of said distal end.

2. A writing instrument as recited in claim 1 and further comprising a bridge circuit responsive to the change in electrical resistance of said strain gage means and operative to produce an electrical signal corresponding to the movement of said distal end.

3. A writing instrument as recited in claim 1 wherein said strain gage means comprises a plurality of strain gages.

4. A writing instrument as recited in claim 1 wherein said means forming a cavity includes a sidewall and wherein said reservoir includes means for frictionally engaging said sidewall, said means for frictionally engaging serving to removably mount said reservoir within said cavity.

5. A writing instrument as recited in claim 4 wherein said means for frictionally engaging includes a plurality of resilient members protruding from the outer surface of said reservoir, said members being capable of deforming when frictionally engaged by said sidewall in such a manner as to maintain said reservoir within said cavity.

6. A writing instrument as recited in claim 5 wherein said members are elongated and extend in a direction generally parallel to said shaft.

7. A writing instrument as recited in claim 1 and further comprising a handle, and means for selectively affixing said housing to said handle.

8. A writing instrument as recited in claim 7 and further comprising means disposed between said handle and said means for selectively affixing for precluding said housing from rotating about an axis through said shaft when said distal end is moved.

9. A writing instrument as recited in claim 7 wherein said handle includes an opening, and said means for selectively affixing includes an element extending from said diaphragm through said opening and a locking cap secured to said element and capable of locking said housing in a selected orientation.

10. A writing instrument as recited in claim 9 wherein said flexible diaphragm, said means forming a cavity and said element are formed integral with said housing.

* * * * *